United States Patent [19]

Falender et al.

[11] 3,975,455

[45] Aug. 17, 1976

[54] ALTERING GAS PERMEABILITIES OF POLYMERIC MATERIAL

[75] Inventors: James R. Falender, Sanford; Sarah E. Lindsey, Midland; Andrew H. Ward, Midland; Thomas C. Kendrick, Midland, all of Mich.

[73] Assignee: Dow Corning Corporation, Midland, Mich.

[22] Filed: Aug. 3, 1973

[21] Appl. No.: 385,359

[52] U.S. Cl.................... 260/827; 260/DIG. 32; 260/824 R; 264/210 R; 264/291
[51] Int. Cl.².............. C08L 83/06; C08L 83/10
[58] Field of Search.................. 260/827, DIG. 32; 264/210

[56] References Cited
UNITED STATES PATENTS

| | | | |
|---|---|---|---|
| 3,234,313 | 2/1966 | Miller et al. | 260/DIG. 32 |
| 3,326,869 | 6/1967 | Perrone | 260/827 |
| 3,678,126 | 7/1972 | Saam et al. | 260/827 |
| 3,798,185 | 3/1974 | Skiens et al. | 260/827 |

*Primary Examiner*—Wilbert T. Briggs, Sr.
*Attorney, Agent, or Firm*—Roger H. Borrousch

[57] ABSTRACT

The gas permeability of a polymeric material is altered by irreversibly mechanically stressing in at least one direction a polymeric material which is a mixture of two phases where one phase is evenly distributed throughout a second phase and one phase is present in an amount of at least 10 weight percent. The phases are polymeric materials which each have an elastic shear modulus of less than $10^9$ dynes per square centimeter at processing temperature, are chemically dissimilar materials and have oxygen gas permeabilities which differ by a factor of at least 10. At least one phase is a thermoplastic which is solid at ambient temperature and the mixture retains its physical state on standing at ambient temperature over extended periods of time. An example would be cold rolling a sheet of a polyblend of polyethylene and polydimethylsiloxane. Mechanically stressing film in at least one direction by cold rolling, drawing or blowing polymeric materials as defined above alters the gas permeability from unstressed film. An extruded tube of polymeric material mechanically stressed in at least one direction has altered gas permeability compared to an unstressed tube.

12 Claims, No Drawings

ALTERING GAS PERMEABILITIES OF POLYMERIC MATERIAL

This invention relates to a method of altering the gas permeability of polymeric materials, polymeric materials suitable for altering their gas permeabilities and to films and tubes having altered gas permeabilities.

The gas permeability of polymeric materials is important to many applications, particularly where films and tubes are used. In many applications a particular polymeric material is selected because it has a low gas permeability or a high gas permeability and thus other physical properties must be of secondary consideration. For example, in an application wherein a film is used requires a specific high gas permeability, if however, the correct gas permeability is found in a polymeric material the strength may be too low to make this polymeric material useful. As a result, one compromises gas permeability for physical strength and the particular use is changed to compensate for the change in gas permeability.

Therefore, it is an object of this invention to alter the gas permeability of a polymeric material in a manner which does not drastically compromise the other physical and chemical properties of a polymeric material. This object and others will become apparent from the following detailed description of the invention.

This invention relates to a method for altering the gas permeability of a polymeric material comprising irreversibly mechanically stressing said polymeric material in at least one direction at a suitable processing temperature and thereafter reducing the temperature within a suitable time period to retain molecular orientation within said polymeric material which had been oriented by said stressing, said polymeric material consisting essentially of a mixture of at least two perceptibly distinct phases wherein at least one phase is evenly distributed throughout a second phase in which said distributed phase particles have diameters perpendicular to the longitudinal axis of less than 100 microns and in which one phase is present in an amount of at least 10 weight percent where the total weight of all the phases is 100 weight percent, said phases being polymeric materials which each have an elastic shear modulus of less than $10^9$ dynes per square centimeter at processing temperature and which are flowable at processing temperatures, said polymeric materials of the phases being chemically dissimilar materials having oxygen gas permeabilities which differ by a factor of at least 10 wherein said gas permeabilities are in units of $cm^3(mil)/(24\ hr)(100\ in^2)(atm)$, at least one phase being a thermoplastic polymeric material which is a solid at ambient temperature, and said mixture retaining the above stated physical state on standing at ambient temperature over an extended period of time.

This invention also relates to mixtures which are capable of having their gas permeability altered by irreversible mechanical stressing. The mixtures consist essentially of at least two perceptibly distinct phases. By the term "at least two perceptibly distinct phases", it is to be understood that two or more phases can be observed by suitable resolutory means, such as by photomicroscopy, X-ray diffraction, electron microscopy and light microscopy and exclude mixtures of materials which are solid solutions. The mixtures of the perceptibly distinct phases have at least one phase evenly distributed throughout a second phase. The distributed phase particles have diameters which are perpendicular to the longitudinal axis of less than 100 microns and can be in either regular or irregular shapes. Some shapes include spheres, rods, plates, threads, and variations of these and others. The particular shape of the distributed phase is not critical. The distributed phase must be distinctly observed wherein the diameters perpendicular to the longitudinal axis are less than 100 microns. A diameter refers to the length of a straight line through the center of an object, in this case the distributed phase particles. Preferably, all the diameters are less than 50 microns including the longitudinal diameter.

One phase of the mixture is present in an amount of at least 10 weight percent, preferably at least 20 weight percent. The weight percentages being based on the total weight of all the phases as being 100 weight percent. For example, if the distributed phase of a two phase mixture is 10 weight percent, the other phase would constitute 90 weight percent, or if two distributed phases of a three phase mixture make 25 weight percent of the total weight of the mixture, the third phase is 75 weight percent. Mixtures wherein one phase is less than 10 weight percent would have gas permeabilities which would not be significantly altered by irreversible mechanical stressing.

The phases herein described consist essentially of polymeric materials. The particular polymeric materials of each phase are not critical to this invention except insofar as they meet the property requirements herein defined. For example, at least one phase must be a thermoplastic polymeric material which is a solid at ambient temperature. A thermoplastic polymeric material for the purpose of this invention are those materials which soften or fuse when heated and harden when cooled. Each of the polymeric materials have an elastic shear modulus of less than $10^9$ dynes per square centimeter at processing temperature, preferably less than $10^7$ dynes per square centimeter at processing temperature. Because at least one phase can be a liquid at processing temperature a zero elastic shear modulus is considered within the scope of this modulus requirement. Processing temperatures vary broadly and include temperatures such as room temperature to temperatures above the melting or softening temperatures of the polymeric materials. Processing temperatures are not intended to include temperatures which are destructive to the polymeric materials. It is not practical to place a maximum processing temperature on the polymeric materials because they vary widely in melting and softening temperatures as well as temperatures which are destructive. A softening temperature for one polymeric material may be a destructive temperature for another polymeric material. The polymeric materials are flowable at processing temperatures. Flowable at processing temperature means, for the purpose of this invention, the polymeric material will flow under the processing conditions at the temperature of processing. Each phase must be flowable which means that those materials which are sufficiently crosslinked to be non-flowable at processing temperatures are not included within the scope of this invention, even if the elastic shear modulus is less than $10^9$ dynes per square centimeter at processing temperature. The elastic shear modulus is defined in the procedure set forth in ASTM:D2236-70.

The polymeric materials of the phases also are chemically dissimilar materials. Chemically dissimilar materials are molecularly different materials, such as polyethylene and polydimethylsiloxane or polystyrene and polybutadiene. Chemically dissimilar materials are intended to exclude and distinguish from physically dissimilar materials, such as amorphous polyethylene and crystalline polyethylene. In addition to being chemically dissimilar, the materials must also have oxygen gas permeabilities which vary by a factor of at least 10. Polymeric materials having oxygen gas permeabilities which vary by a factor of less than 10 are not suitable for this invention.

The gas permeability can be determined in any suitable manner and include the procedure defined by ASTM:D1434-66 (Reapproved 1972). The units for gas permeability used herein are $cm^3(mil)/(24\ hr)(100\ in^2)(atm)$ wherein "$cm^3$" is cubic centimeters, "hr" is hours, "$in^2$" is square inches and "atm" is atmospheres.

The polymeric materials used to make the mixture of phases defined above include a wide variety of materials including solids, liquids, gums, thermoplastics and the like which meet the parameters defined herein. Such combinations are too numerous to mention in detail. The mixture of phases can include block and graft copolymers wherein one block satisfies one phase such as the distributed phase and another block satisfies a second phase in which the first phase is distributed. Thus, the phases can be two or more blended polymeric materials which form the phases or they can be a single polymeric material in the form of a block or graft copolymer which forms the phases and variations between blends and copolymers are also included, such as a graft or block copolymer blended with two or more blended polymeric materials. These mixtures of phases of polymeric materials can be illustrated but do not limit the scope of the present invention by phases consisting essentially of hydrocarbon polymers, hydrocarbon copolymers and mixtures thereof, such polymers being derived from polymerizing and copolymerizing monomeric units of ethylene, α-olefins, styrene, alphamethylstyrene, butadiene and the like. Another phase can be a polydiorganosiloxane such as those containing dimethylsiloxane units, diethylsiloxane units, ethylmethylsiloxane units, methylvinylsiloxane units, methylphenylsiloxane units, diphenylsiloxane units and methyl-3,3,3-trifluoropropylsiloxane units, for example. The polydiorganosiloxanes have at least 50 percent of methyl or ethyl radicals based on the total number of organic radicals. The polydiorganosiloxanes can be endblocked with hydroxyl groups triorganosiloxy units wherein the organic groups are those defined above. The polydiorganosiloxanes which are particularly useful for this invention include polydimethylsiloxane and polydiorganosiloxane copolymers of dimethylsiloxane units and methylvinylsiloxane units, such as those containing up to 25 mol percent methylvinylsiloxane units.

Illustrative of particularly useful combinations of polymeric materials which provide a mixture of phases suitable for this invention are polyethylene and polydiorganosiloxane and a block copolymer consisting of blocks of polyalphamethylstyrene capped with shorter blocks of polystyrene and blocks of polydimethylsiloxane. These block copolymers are described and can be made by the method described in U.S. Pat. No. 3,665,052 which is hereby incorporated by reference. Other polysiloxane containing blends include those polymeric materials defined by U.S. Pat. No. 3,686,356 which is hereby incorporated by reference. The copolymers and blends defined in the two foregoing patents are only suitable for the present invention if they have the herein defined characteristics. Still other polysiloxane block copolymers suitable for the present invention are described in U.S. Pat. Nos. 3,678,125 and 3,678,126 both of which are hereby incorporated by reference. Blends of hydrocarbon polymers and polydiorganosiloxanes can be made by mechanical blending, including those which require certain blending aids to achieve a suitable blend, such as silica, heat and shear, and surface active agents. The combination of polydiorganosiloxanes and hydrocarbon polymers and copolymers are particularly useful because the hydrocarbon polymers and copolymers have relatively low oxygen gas permeabilities and polydiorganosiloxanes have relatively high oxygen gas permeabilities, such that they vary as much as by a factor of 291.

All of the above described materials must retain their physical state on standing at ambient temperature over an extended period of time. Thus the phases do not separate into two distinct layers upon standing at ambient temperatures and the distributed phase does not extrude from the mixture of phases but the general physical state of at least one phase evenly distributed throughout a second phase is retained. For the purpose of this invention, an extended period of time includes those lengths of time which are necessary for storage and use of the compositions. For example, the extended periods of time may be a period, such as, six months or a year of storage.

The polymeric materials suitable for this invention can include other ingredients which are conventionally used in polymeric materials such as fillers, like silica, and carbon black, heat stabilizers, antioxidants, and the like. It is, however, cautioned, that ingredients which disturb the two phases sufficiently to either cause solution or separation into layers or otherwise cause the phases as described to be changed enough to take them outside the scope of this invention.

The above described polymeric materials consisting essentially of at least two perceptibly distinct phases have their gas permeabilities altered by irreversibly mechanically stressing the polymeric material in at least one direction at a suitable processing temperature. The temperature is reduced within a suitable time period to retain molecular orientation within the polymeric material which molecular orientation was obtained by the stressing means. The mechanical stressing can be achieved by cold rolling a film or sheet or block of polymeric material between two rolls adjusted to reduce the thickness of the object passing therebetween. The object to be stressed is best reduced in thickness by incremental reduction by passing the object through the rolls a number of times, reducing the bite until the desired stress is obtained. This incremental reduction in thickness can be through the same two rolls or a series of rollers wherein each pair of rolls the object passes through, reduces the thickness. The cold rolling can be done at ambient temperatures if the polymeric materials are flowable at this temperature and if the elastic shear modulus is less than $10^9$ dynes per square centimeter. Where ambient temperature is the processing temperature, the reduction of the processing temperature is zero because the molecular orientation obtained by the stressing is retained when the polymeric material is a solid. Stressing by rolling can be done at other temperatures than ambient if the particular polymeric material is not flowable at ambient temperatures. In this case, the processing temperature can be reduced to ambient if the molecular orientation cannot be retained at the processing temperature, however most stressing operations will be done with solid materials and thus no rapid reduction in temperature after stressing would be necessary. Natural cooling would be sufficient.

Mechanical stressing in at least one direction can be done by extruding a solid polymeric material through a die, to make a tube, for example. The processing temperatures can be varied as in the case of rolling to provide mechanical stress. Extruding, as used herein, is intended to include combinations of extruding and drawing of tubes. Additionally the polymeric material can be mechanically stressed by passing molten material through a die at sufficient feed to induce stress. In these cases wherein molten or highly softened polymeric materials are mechanically stressed, the resultant stressed objects are rapidly taken below the solidification temperature of the polymeric material by reducing the temperature rapidly enough to retain the molecular orientation obtained by the stressing. If the temperature is not quickly reduced below the solidification temperature, any molecular orientation is lost and no alteration of gas permeability is observed.

Mechanical stressing can be achieved by drawing a film through a slit or over a mandrel wherein the foregoing processing conditions also apply. A method for mechanically stressing a film in more than one direction can readily be achieved by blowing a film. All of the foregoing techniques are known procedures for fabricating polymeric materials and the apparatus and methods need not be described in detail herein. The present method is directed to altering the gas permeabilities of certain polymeric materials which have two or more phases. The mechanical stressing must be irreversible in that certain molecular orientation is obtained by the stressing which is retained by stressing a solid polymeric material with suitable physical properties or rapidly quenching a mechanically stressed softened or molten polymeric material.

One of the most useful alterations of the gas permeability is those polymeric materials which provide increased gas permeability by mechanically stressing. It was totally unexpected that one could take a polymeric material with low gas permeability and obtain a much higher gas permeability without changing the composition, by mechanically stressing this polymeric material in at least one direction. Thus, a material with suitable strength but unsuitable gas permeability can be irreversibly mechanically stressed to provide a suitable gas permeability without a dramatic loss in strength. Additionally many polymeric materials also increase in strength by mechanical stressing. Most often, those polymeric materials which increase in gas permeability by irreversible mechanical stressing are those wherein the more highly gas permeable phase is the distributed phase and those which decrease in gas permeability are those which have the least gas permeable phase as the distributed phase. However, some polymeric materials will show increases in gas permeability for some gases while decreasing in gas permeability for other gases. The degree of stressing changes the gas permeability, such that the more highly stressed polymeric material will have greater changes in the gas permeability. Thus, the present method can be used to control the gas permeability of a particular polymeric material over a reasonably broad spectrum.

Films suitable for packaging, diaphragms and the like prepared by the presently defined method have mechanically stressed molecular orientation in at least one direction and have gas permeabilities which has been altered when compared to a compositionally equivalent unstressed film. Particularly useful films are those cold rolled films which have increased gas permeabilities compared to unstressed films. Blown films which have mechanically stressed molecular orientation in more than one direction are particularly useful wherein two perceptibly distinct phases are chemically bonded in the form of a block copolymer which consists essentially of thermoplastic blocks of polyalphamethylstyrene capped with short chain polystyrene blocks and polydimethylsiloxane blocks.

The following examples are presented for illustrative purposes only and should not be construed as limiting the present invention which is properly delineated in the claims.

EXAMPLE 1

A blend of 50 weight percent high density polyethylene and 50 weight percent of a polydiorganosiloxane gum containing 96 mol percent dimethylsiloxane units and 4 mol percent methylvinylsiloxane units was prepared in a Brabender Plasticorder by mixing for 54 minutes at 220°C. and 25 rpm using a CAM head. The resulting product was a mixture of two perceptibly distinct phases with the polydiorganosiloxane observed as the distributed phase in a polyethylene phase with the largest polydiorganosiloxane particle diameter being less than 0.1 micron. The mixture of phases was observed by obtaining a photomicrograph using a magnification of 2500X. Two sheets of the above mixture were compression molded at 177°C. One sheet having a thickness of 0.045 inch was tested for gas permeability. The other sheet having a thickness of 0.076 inch was cold rolled by passing the sheet through two rolls reducing the thickness by approximately 0.005 inch per pass. The final thickness of the cold rolled sheet was 0.035 inch. A photomicrograph of the cold rolled sheet showed that molecular orientation had occurred by mechanical stressing. The gas permeabilities of the unoriented and the oriented sheets were obtained by using the procedure defined by ASTM:D-1434-66 (Reapproved 1972).

TABLE I

| Material | Permeability $(cm^3)$ $(mil)/(100\ in^2)$ $(24\ hr)$ $(atm)$ | | |
|---|---|---|---|
| | Oxygen | Nitrogen | Carbon dioxide |
| Above sheet as molded | 1847 | 444 | 9625 |
| Above sheet cold rolled | 4910 | 1470 | 29,500 |
| High density polyethylene* | 419 | 138 | 210 |
| Diorganopolysiloxane* | 122,000 | 55,000 | 467,000 |

*Presented for comparative purposes.

From Table I, the increases in gas permeability for oxygen, nitrogen and carbon dioxide are 167 percent, 231 percent and 207 percent respectively by mechanically stressing the sheet to provide molecular orientation.

EXAMPLE 2

A block copolymer was prepared by the method of U.S. Pat. No. 3,665,052. The block copolymer consisted of blocks of polyalphamethylstyrene capped with polystyrene and blocks of polydimethylsiloxane. The block copolymer contained 37 weight percent polyalphamethylstyrene, 3 weight percent polystyrene and 60 weight percent polydimethylsiloxane. A solution cast film of the above block copolymer was prepared at a thickness of 0.022 inch. A distributed phase in a second phase was observed by electron microscopy. The gas permeability of the solution cast film was determined to show unstressed gas permeability. A sheet of the above block copolymer was compression molded into a 10 inch square having a thickness of 0.080 inch. This sheet was clamped in a device wherein the center portion of the sheet was drawn down over a cylindrical mandrel at the rate of 20 inches per minute and at a temperature of 99°C. The total distance drawn was 6 inches. The average thickness of the drawn portion of the film was 0.0085 inch. This drawn portion was observed to have biaxial orientation from the mechanical stressing. The gas permeabilities were determined on the drawn film and were as shown in Table II.

TABLE II

| Material | Permeability $(cm^3)$ $(mil)/(100\ in^2)$ $(24\ hr)$ $(atm)$ | | |
|---|---|---|---|
| | Oxygen | Nitrogen | Carbon dioxide |
| Solution casted film | 17,090 | 8,735 | 80,180 |
| Drawn Film | 33,050 | 14,880 | 73,470 |

From Table II, it is observed that the gas permeabilities are altered, but the changes are not the same for all the gases. The gas permeabilities for oxygen and nitrogen increase whereas the gas permeability for carbon dioxide decreases. The changes in gas permeabilities for oxygen, nitrogen, and carbon dioxide are +93.5 percent, +70 percent and −8.4 percent respectively by mechanically stressing the film to provide molecular orientation.

EXAMPLE 3

Blends were prepared as described in Example 1 except a first blend contained 75 weight percent of the polydiorganosiloxane and 25 weight percent of the polyethylene and a second blend contained 75 weight percent of the polydiorganosiloxane, 25 weight percent of the polyethylene and 10 parts of fume silica was blended with 100 parts of the polydiorganosiloxane and polyethylene. Two sheets of each blend were prepared as described in Example 1 and one of each blend was cold rolled while the other was tested as molded. The gas permeabilities were determined and were as shown in Table III.

changes in gas permeability for the first blend for oxygen, nitrogen and carbon dioxide were 583 percent, 688 percent and 1364 percent respectively by mechanically stressing the sheets to provide molecular orientation. The changes in gas permeability for the second blend for oxygen, nitrogen and carbon dioxide were 25.6 percent, 23.5 percent and 8.4 percent respective by mechanically stressing the sheets to provide molecular orientation.

That which is claimed is:

1. A method for altering the gas permeability of a polymeric material comprising irreversibly mechanically stressing said polymeric material in at least one direction at a suitable processing temperature and thereafter reducing the temperature within a suitable time period to retain molecular orientation within said polymeric material which had been oriented by said stressing and where oxygen gas permeability is increased, said polymeric material consisting essentially of a mixture of two perceptibly distinct phases wherein one phase is evenly distributed throughout a second phase in which said distributed phase is a polydiorganosiloxane wherein the organic groups are selected from the group consisting essentially of methyl, ethyl, vinyl, phenyl and 3,3,3-trifluoropropyl radicals where at least 50 percent of the organic groups are methyl or ethyl radicals and in which said distributed phase particles have diameters perpendicular to the longitudinal axis of less than 100 microns and in which one phase is present in an amount of at least 10 weight percent where the total weight of all the phases is 100 weight percent, said phases being polymeric materials which each have an elastic shear modulus of less than $10^9$ dynes per square centimeter at processing temperature and which are flowable at processing temperatures, said polymeric materials of the phases being chemically dissimilar materials having oxygen gas permeabilities which differ by a factor of at least 10 wherein said gas permeabilities are in units of $cm^3(mil)/(24\ hr)\ (100\ in^2)\ (atm)$, one phase being a thermoplastic polymeric material which is a solid at ambient temperature, and said mixture retaining the above stated physical state on standing at ambient temperature over an extended period of time.

2. The method in accordance with claim 1 in which the second phase is selected from the group consisting of a hydrocarbon polymer, hydrocarbon copolymers and mixtures thereof.

3. The method in accordance with claim 2 in which the polydiorganosiloxane is a copolymer of dimethylsiloxane units and methylvinyl siloxane units and the second phase is polyethylene.

TABLE III

| Blend | Sheet Tested | Permeability $(cm^3)$ $(mil)/(100\ in^2)$ $(24\ hr)$ $(atm)$ | | | |
|---|---|---|---|---|---|
| | | Thickness, inches | Oxygen | Nitrogen | Carbon dioxide |
| First Blend | as molded | 0.070 | 2,365 | 821 | 4,894 |
| First Blend | cold rolled | 0.044 | 16,145 | 6,468 | 71,674 |
| Second Blend | as molded | 0.066 | 11,715 | 4,891 | 65,950 |
| Second Blend | cold rolled | 0.047 | 14,716 | 6,040 | 71,480 |

From Table III, it is observed that the gas permeabilities are altered even when a filler is present in the composition although the changes are less dramatic. The 4. The method in accordance with claim 2 in which the polydiorganosiloxane is a polydimethylsiloxane and the second phase is a hydrocarbon copolymer derived from monomeric units of styrene and alphamethylstyrene.

5. The method in accordance with claim 1 in which two perceptibly distinct phases are chemically bonded in the form of a block copolymer.

6. The method in accordance with claim 5 in which the block copolymer consists essentially of thermoplastic blocks of polyalphamethylstyrene capped with short chain polystyrene blocks and polydimethylsiloxane blocks.

7. A film comprising two polymeric materials having mechanically stressed molecular orientation in at least one direction and having an oxygen gas permeability increased from a compositionally equivalent unstressed mixture consisting essentially of two perceptibly distinct phases wherein one phase is evenly distributed throughout a second phase in which said distributed phase is a polydiorganosiloxane wherein the organic groups are selected from the group consisting essentially of methyl, ethyl, vinyl, phenyl and 3,3,3-trifluoropropyl radicals where at least 50 percent of the organic groups are methyl or ethyl radicals and in which said distributed phase particles have diameters perpendicular to the longitudinal axis of less than 100 microns and in which one phase is present in an amount of at least 10 weight percent where the total weight of all the phases is 100 weight percent, said phases being polymeric materials which each have an elastic shear modulus of less than $10^9$ dynes per square centimeter at processing temperature and which are flowable at processing temperatures, said polymeric materials of the phases being chemically dissimilar materials having oxygen gas permeabilities which differ by a factor of at least 10 wherein said gas permeabilities are in units of cm$^3$(mil) (24 hr) (100 in$^2$) (atm), one phase being a thermoplastic polymeric material which is a solid at ambient temperature, and said mixture retaining the above stated physical state on standing at ambient temperature over an extended period of time.

8. The film in accordance with claim 7 which is a cold rolld film having increased oxygen gas permeability over a compositionally equivalent unstressed film.

9. An extruded tube comprising two polymeric materials having mechanically stressed molecular orientation in at least one direction and having an oxygen gas permeability increased from a compositionally equivalent unstressed mixture consisting essentially of two perceptibly distinct phases wherein one phase is evenly distributed throughout a second phase in which said distributed phase is a polydiorganosiloxane wherein the organic groups are selected from the group consisting essentially of methyl, ethyl, vinyl, phenyl and 3,3,3-trifluoropropyl radicals where at least 50 percent of the organic groups are methyl or ethyl radicals and in which said distributed phase particles have diameters perpendicular to the longitudinal axis of less than 100 microns and in which one phase is present in an amount of at least 10 weight percent where the total weight of all the phases is 100 weight percent, said phases being polymeric materials which each have an elastic shear modulus of less than $10^9$ dynes per square centimeter at processing temperature and which are flowable at processing temperatures, said polymeric materials of the phases being chemically dissimilar materials having oxygen gas permeabilities which differ by a factor of at least 10 wherein said gas permeabilities are in units of cm$^3$(mil)/(24 hr) (100 in$^2$) (atm), one phase being a thermoplastic polymeric material which is a solid at ambient temperature, and said mixture retaining the above stated physical state on standing at ambient temperature over an extended period of time.

10. A drawn film comprising two polymeric materials having mechanically stressed molecular orientation in at least one direction and having an oxygen gas permeability increased from a compositionally equivalent unstressed mixture consisting essentially of two perceptibly distinct phases wherein one phase is evenly distributed throughout a second phase in which said distributed phase is a polydiorganosiloxane wherein the organic groups are selected from the group consisting essentially of methyl, ethyl, vinyl, phenyl and 3,3,3-trifluoropropyl radicals where at least 50 percent of the organic groups are methyl or ethyl radicals and in which said distributed phase particles have diameters perpendicular to the longitudinal axis of less than 100 microns and in which one phase is present in an amount of at least 10 weight percent where the total weight of all the phases is 100 weight percent, said phases being polymeric materials which each have an elastic shear modulus of less than $10^9$ dynes per square centimeter at processing temperature and which are flowable at processing temperatures, said polymeric materials of the phases being chemically dissimilar materials having oxygen gas permeabilities which differ by a factor of at least 10 wherein said gas permeabilities are in units of cm$^3$(mil)/(24 hr) (100 in$^2$) (atm), one phase being a thermoplastic polymeric material which is a solid at ambient temperature, and said mixture retaining the above stated physical state on standing at ambient temperature over an extended period of time.

11. A blown film comprising two polymeric materials having mechanically stressed molecular orientation in more than one direction and having an oxygen gas permeability increased from a compositionally equivalent unstressed mixture consisting essentially of two perceptibly distinct phases wherein one phase is evenly distributed throughout a second phase in which said distributed phase is a polydiorganosiloxane wherein the organic groups are selected from the group consisting essentially of methyl, ethyl, vinyl, phenyl and 3,3,3-trifluoropropyl radicals where at least 50 percent of the organic groups are methyl or ethyl radicals and in which said distributed phase particles have diameters perpendicular to the longitudinal axis of less than 100 microns and in which one phase is present in an amount of at least 10 weight percent where the total weight of all the phases is 100 weight percent, said phases being polymeric materials which each have an elastic shear modulus of less than $10^9$ dynes per square centimeter at processing temperature and which are flowable at processing temperatures, and polymeric materials of the phases being chemically dissimilar materials having oxygen gas permeabilities which differ by a factor of at least 10 wherein said gas permeabilities are in units of cm$^3$(mil)/(24 hr) (100 in$^2$) (atm), one phase being a thermoplastic polymeric material which is a solid at ambient temperature, and said mixture retaining the above stated physical state on standing at ambient temperature over an extended period of time.

12. The blown film in accordance with claim 11 in which two perceptibly distinct phases are chemically bonded in the form of a block copolymer which consists essentially of thermoplastic blocks of polyalphamethylstyrene capped with short chain polystyrene blocks and polydimethylsiloxane blocks.

* * * * *

UNITED STATES PATENT AND TRADEMARK OFFICE
CERTIFICATE OF CORRECTION

PATENT NO. : 3,975,455
DATED : August 17, 1976
INVENTOR(S) : JAMES R. FALENDER ET AL It is certified that error appears in the above-identified patent and that said Letters Patent are hereby corrected as shown below:

Column 9, line 35, should read
-- $cm^3(mil)/(24\ hr)\ (100\ in^2)\ (atm)$, one phase being a --

Column 9, line 41, "rolld" should read --rolled--

Signed and Sealed this

Seventeenth Day of June 1980

[SEAL]

Attest:

SIDNEY A. DIAMOND

Attesting Officer

Commissioner of Patents and Trademarks